United States Patent [19]
Bednar

[11] Patent Number: 5,890,354
[45] Date of Patent: Apr. 6, 1999

[54] ROTARY LAWN MOWER MULCHING DECK

[75] Inventor: Richard D. Bednar, Lake Mills, Wis.

[73] Assignee: Ransomes America Corporation, Lincoln, Nebr.

[21] Appl. No.: 787,383

[22] Filed: Jan. 22, 1997

Related U.S. Application Data

[60] Provisional application No. 60/025,822, Aug. 30, 1996.

[51] Int. Cl.[6] .................................................. A01D 34/66
[52] U.S. Cl. ...................... 56/320.1; 56/255; 56/DIG. 17
[58] Field of Search .............................. 56/320.1, 320.2, 56/17.5, 255, 295, DIG. 17, DIG. 20, DIG. 5, DIG. 8, DIG. 9, DIG. 22, DIG. 24

[56] References Cited

U.S. PATENT DOCUMENTS

| | | | |
|---|---|---|---|
| Re. 31,930 | 7/1985 | Luick | 56/320.1 X |
| 4,135,351 | 1/1979 | Akgulian | 56/255 |
| 4,189,903 | 2/1980 | Jackson et al. | 56/255 |
| 4,205,512 | 6/1980 | Thorud | 56/13.4 |
| 4,213,289 | 7/1980 | Kamppinen | 56/295 |
| 4,292,791 | 10/1981 | Lalonde | 56/255 |
| 4,426,831 | 1/1984 | Klas et al. | 56/295 |
| 4,559,769 | 12/1985 | Seyerle | 56/295 |
| 4,686,819 | 8/1987 | Bryant | 56/295 |
| 4,712,364 | 12/1987 | Oxley | 56/295 |
| 4,951,449 | 8/1990 | Thorud | 56/2 |
| 5,035,108 | 7/1991 | Meyer et al. | 56/13.4 |
| 5,109,656 | 5/1992 | Zimmer | 56/17.5 |
| 5,129,217 | 7/1992 | Loehr | 56/13.6 |
| 5,133,176 | 7/1992 | Baumann et al. | 56/17.4 |
| 5,199,251 | 4/1993 | Rouse et al. | 56/255 |
| 5,205,112 | 4/1993 | Tillotson et al. | 56/2 |
| 5,209,052 | 5/1993 | Carroll | 56/255 |
| 5,212,938 | 5/1993 | Zenner et al. | 56/320.1 |
| 5,259,176 | 11/1993 | Kahamura et al. | 56/255 |
| 5,267,429 | 12/1993 | Kettler et al. | 56/295 |
| 5,305,589 | 4/1994 | Rodriguez et al. | 56/320.1 |
| 5,321,940 | 6/1994 | Peterson | 56/255 |
| 5,457,947 | 10/1995 | Samejima et al. | 56/320.2 X |
| 5,465,564 | 11/1995 | Koehn et al. | 56/320.2 |

Primary Examiner—Terry Lee Melius
Attorney, Agent, or Firm—Michael Best & Friedrich LLP

[57] ABSTRACT

The invention provides a rotary lawn mower with an improved mulching deck. The rotary lawn mower comprises a plurality of sets of cutting blades. Each of the blade sets includes a lower, leading blade and an upper, trailing blade. The lower blade has a leading cutting edge and an upwardly angled trailing edge. The upper trailing blade extends at an angle relative to the leading blade and has a leading cutting edge for cutting clippings deflected upwardly by the upwardly angled trailing edge of the leading blade. The lawn mower further comprises a mulching deck including a plastic, dent-resistant, rust-proof insert which is positioned in the deck. The insert provides correct air flow for mulching and a sound barrier for reduced noise. The insert defines a plurality of recesses. A blade set is mounted for rotation about an axis of each recess. The insert includes an integral, arcuate baffle extending downwardly adjacent the periphery of one of the recesses impeding air flow from the one recess to an adjacent recess. The insert also includes an integral projection in one of the left and right recesses such that the recess has a decreased height in the area of the projection. The projection prevents downward flow of air that would otherwise result from converging air from two adjacent blade sets. The lawn mower further comprises a front deflector removably mounted on the front portion of the deck side wall to allow venting of air but not discharge of clippings from the front of the deck.

17 Claims, 4 Drawing Sheets

ROTARY LAWN MOWER MULCHING DECK

This application claim the benefit of U.S. Provisional No. 60/025,822 filed Aug. 30, 1996.

BACKGROUND OF THE INVENTION

The invention relates to rotary lawn mowers, and more particularly to mulching decks for rotary lawn mowers.

The popularity of mulching mowers has increased dramatically in recent years as new environmental laws have made it illegal, or at least extremely inconvenient, to bag lawn mower clippings. The need therefore exists for a mulching deck that mulches grass into extremely fine clippings for speedy decomposition.

SUMMARY OF THE INVENTION

The invention provides an improved mulching deck for a rotary lawn mower. Preferably, the deck includes a durable, plastic, dent-resistant, rust-proof insert that is contoured to provide the correct air flow for mulching and that also provides a good sound barrier for reduced noise.

In the preferred embodiment, the insert defines center, left, and right downwardly opening, generally circular, bowl-shaped recesses, with a respective set of cutting blades rotating about the central axis of each recess.

The insert also preferably includes an arcuate baffle. The integral arcuate baffle extends downwardly adjacent the periphery of one of the recesses and impedes air flow from that recess to an adjacent recess.

The insert also preferably includes an integral projection located in the left or right recess such that the recess has a decreased height in the area of the projection. The integral projection prevents downward flow of air that would otherwise result from converging air flows created by the adjacent blade sets.

In the preferred embodiment, the deck is front-vented and includes at least one front deflector which is preferably used only for cutting short grass. The front deflector is removably mounted on the front portion of the deck side wall and allows venting of air but not discharge of cut grass from the front of the deck.

In the preferred embodiment, improved sets of cutting blades are provided. The blade sets cut and recut the grass immediately before it has a chance to start swirling around within the insert. Preferably, each blade set includes a lower leading blade having a leading cutting edge and an upwardly angled trailing edge, and an upper trailing blade having a leading cutting edge for cutting clippings deflected upwardly by the upwardly angled trailing edge of the leading blade. Further, each blade set preferably includes a blade saddle for maintaining the leading blade in proper position relative to the trailing blade. In the preferred embodiment, the trailing blade is oriented at an angle of approximately eighteen degrees relative to the leading blade. Preferably, the blades are driven so that the blade tip speed is approximately 18,000 feet per second.

Other features and advantages of the invention will become apparent to those skilled in the art upon review of the following detailed description, claims and drawings.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Figure 1:
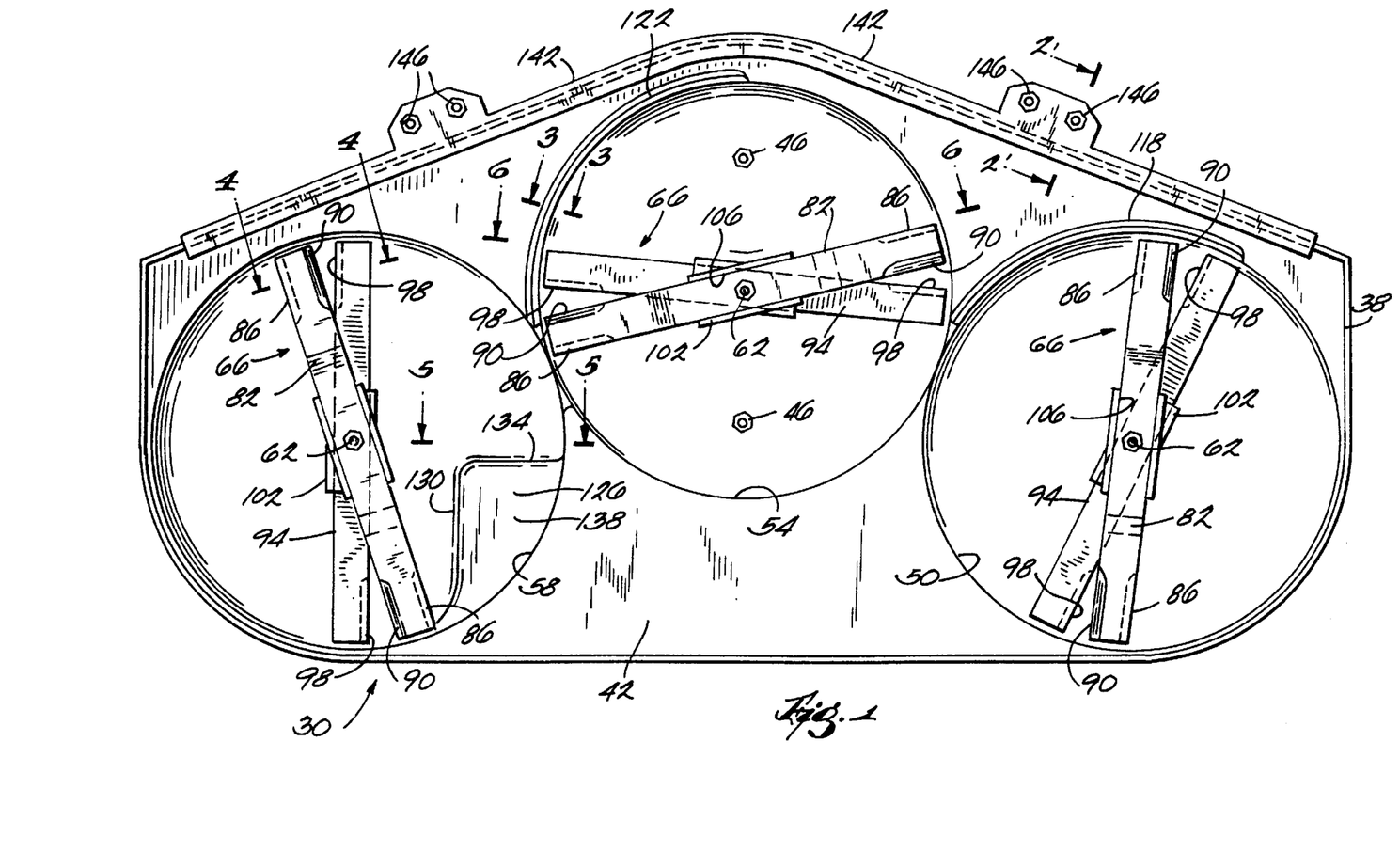
FIG. 1 is a perspective view of a lawn mower embodying the invention.

A rear-steering, four-wheel drive lawn mower 10 embodying the invention is illustrated in FIG. 1. It should be understood that the invention is applicable to front-steering or two-wheel-drive vehicles.

The lawn mower 10 comprises a frame 12 supported by front wheels 16 (only one shown) and rear wheels 20 (only one shown) for movement over the ground.

The lawn mower 10 further comprises an engine (not shown) which is supported by the frame 12. The engine may be any type known in the art, such as a gasoline-powered, internal-combustion engine.

The lawn mower 10 further comprises a conventional steering system including a steering wheel 22. In the illustrated construction, the steering system is hydraulically-operated and is connected to the rear wheels 20 to steer the lawn mower 10.

The lawn mower 10 further comprises (see FIGS. 1 and 2) a front-vented mulching deck 30. The deck 30 is supported by the frame 12 in a typical manner for movement over the ground with the frame 12.

Figure 7:
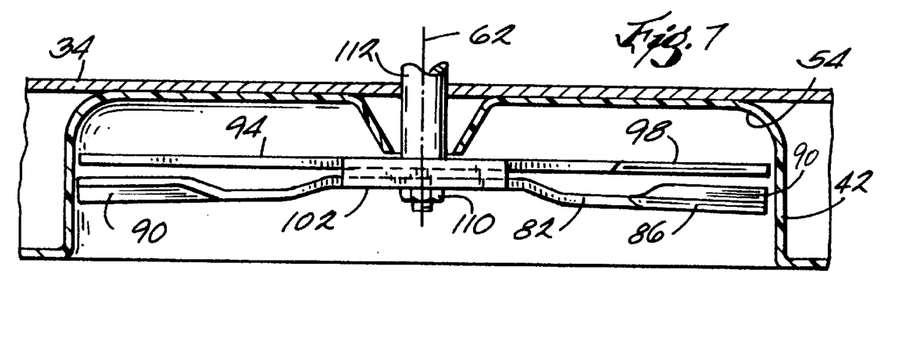
FIG. 7 is a view taken along line 7—7 in FIG. 2.

The deck 30 includes (FIGS. 3, 6 and 7) a generally horizontal top wall 34 and a side wall 38 (FIGS. 2 and 3) having a horizontal portion 39. The side wall 38 depends from the periphery of the top wall 34 to define a downwardly opening space 40.

Figures 3, 4, 5, 6:
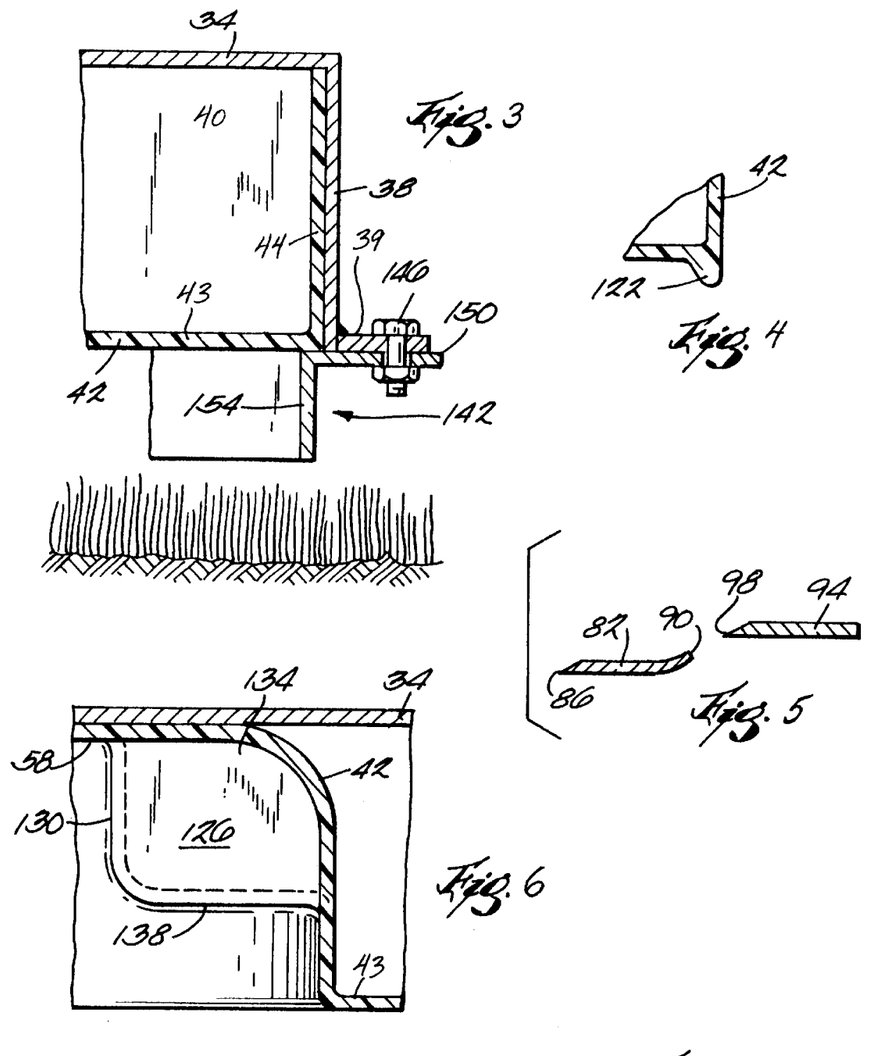
FIG. 3 is a view taken along line 3—3 in FIG. 2.
FIG. 4 is a view taken along line 4—4 in FIG. 2.
FIG. 5 is a view taken along line 5—5 in FIG. 2.
FIG. 6 is a view taken along line 6—6 in FIG. 2.

A plastic, dent-resistant, rust-proof insert 42 is secured in the space 40. The insert 42 is preferably made of polyethylene. The insert 42 can be fixed to the deck 30 by any suitable means, such as bolts 46. The insert 42 includes a bottom wall 43 spaced below the top wall 34 of the deck 30. The insert 42 also includes a side wall 44 extending upwardly from the bottom wall 43 inside the side wall 38 of the deck 30.

Figure 2:
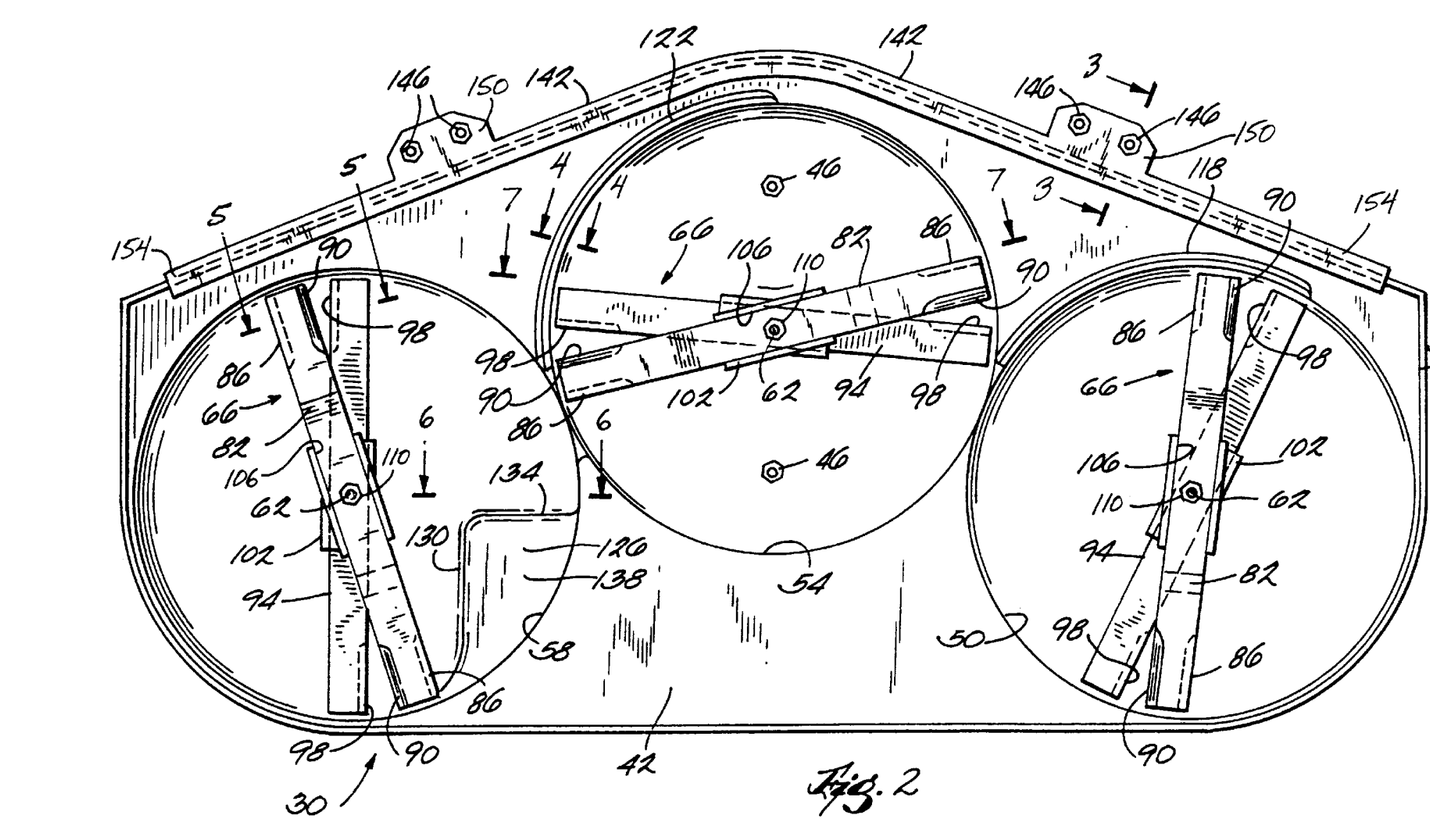
FIG. 2 is a bottom plan view of the underside of a mulching deck of the lawn mower.

The insert 42 defines left, right, and center recesses 50, 54, and 58, respectively in the bottom wall 43 of the insert 42 (the recesses are reversed in FIG. 2 because FIG. 2 is a bottom plan view). Each recess 50, 54, and 58 is downwardly opening, generally circular, and bowl-shaped and has a generally vertical central axis 62. The left recess 50 is located to the left of and rearward relative to the center recess 54, such that the inner front quarter of the left recess 50 is adjacent the left rear quarter of the center recess 54. The right recess 58 is located to the right of and rearward relative to the center recess 54, such that the inner front quarter of the right recess 58 is adjacent the right rear quarter of the center recess 54. The insert 42 provides correct air flow for mulching as described below.

Left, center, and right sets 66 of cutting blades are mounted for rotation about the axes 62 of the left, center, and right recesses 50, 54, and 58, respectively. In the preferred embodiment, the blade sets 66 rotate in a counter-clockwise direction as viewed in FIG. 2. However, the blade sets 66 could be designed and oriented for rotation in the clockwise direction.

Each blade set 66 includes (FIGS. 2, 5, and 7) a lower, leading blade 82 and an upper, trailing blade 94. The leading blade 82 has a leading cutting edge 86 and an upwardly angled trailing edge or lift 90. Preferably, the lift 90 of the leading blade 82 is angled upwardly at an angle of approximately forty-five degrees. The trailing blade 94 has a leading cutting edge 98 for cutting clippings deflected upwardly by the lift 90 of the leading blade 82. Each of the cutting edges 86 and 98 is straight rather than wavy, which is the typical edge shape of a mulching-type cutting blade. This straight edge makes the blades 82 and 94 easier to sharpen which increases the useful life of the blades 82 and 94.

Figure 8:
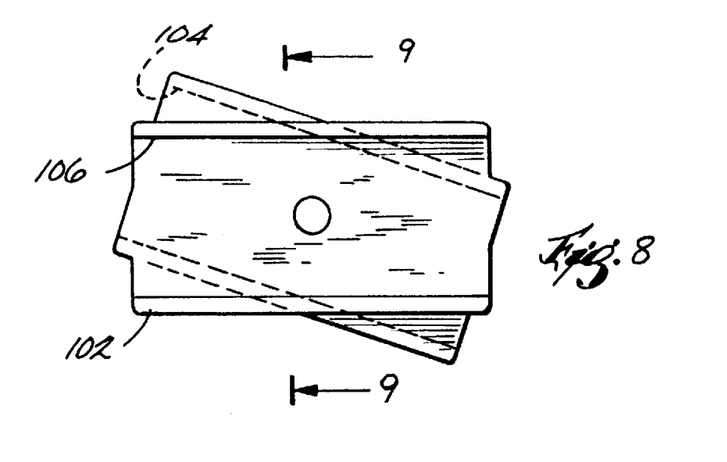
FIG. 8 is a bottom plan view of the blade saddle.
Figure 9:
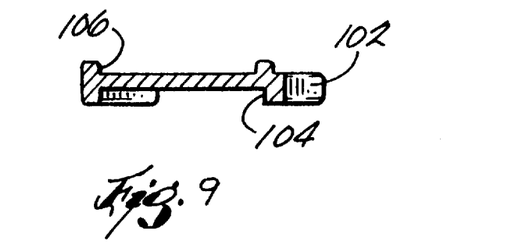
FIG. 9 is a view taken along line 9—9 in FIG. 8.

Each blade set 66 also includes (FIGS. 2, 8 and 9) a blade saddle 102. The blade saddle 102 maintains the leading blade 82 and trailing blade 94 in proper relationship, which includes the trailing blade 94 being oriented at a non-perpendicular angle relative to the leading blade 82 such that clippings coming off the lift 90 of the leading bade 82 are cut immediately by the trailing blade 94 before having a chance to start swirling around within the insert 42. Preferably, the angle between the leading blade 82 and the trailing blade 94 is less than sixty degrees and, more preferably, less than thirty degrees. In the preferred embodiment, the angle between the leading blade 82 and the trailing blade 94 is approximately eighteen degrees.

In the preferred embodiment, each blade 82 and 94 is approximately 22 inches long and 2.5 inches wide. Also, the trailing blade 94 is preferably spaced approximately 0.75 inch above the leading blade 82. The angle, the distance between the blades and the blade dimensions can be varied in other embodiments.

The saddle 102 is preferably made of high strength steel. The saddle 102 includes an upwardly opening pocket 104 (FIG. 8) in which the upper blade 94 is seated, and a downwardly opening pocket 106 in which the lower blade 82 is seated. A nut 110 is threaded onto a respective spindle 112 and secures the saddle and the blades to the spindle 112.

Preferably, the blade sets 66 are driven so that the blades 82 and 94 have a tip speed of approximately 18000 ft/min. This blade tip speed facilitates mulching in which the grass clippings are finely cut. In the preferred embodiment, each blade set 66 is driven by a hydraulic motor (not shown). The hydraulic motors are driven by a hydraulic pump (not shown) powered by the engine. In other embodiments, the blades can be driven by other conventional means.

In operation, the cutting edge 86 of the leading, lower blade 82 cuts the grass. The grass then comes off the lift 90 of the lower blade 82 and is immediately cut by the cutting edge 98 of the trailing, upper blade 94 before the grass begins to swirl around under the deck 30.

To provide correct air flow for mulching, the insert 42 includes (FIGS. 2 and 4) integral, arcuate baffles 118 and 122. The baffle 118 extends downwardly adjacent the periphery of the left recess 50 and extends approximately ninety degrees around the inner front quarter and front portion of the periphery of the left recess 50. The baffle 118 impedes air flow from the recess 50 to the recess 54 and prevents interference with the mulching action of the blade set 66 in the recess 54.

Similarly, the baffle 122 extends downwardly adjacent the periphery of the center recess 54 and extends approximately ninety degrees around the left front quarter of the periphery of the center recess 54. The baffle 122 impedes air flow from the recess 54 to the recess 58.

The designed placement of baffles 118 and 122, as discussed above, results from the blade sets 66 rotating in the counterclockwise direction as viewed in FIG. 2. If the blade sets 66 are designed to rotate in the clockwise direction, the baffles 118 and 122 would be placed to prevent air flow from recess 54 to recess 50 and from recess 58 to recess 54, respectively, in a manner similar to that shown in FIG. 2.

Additionally, the insert 42 includes (FIGS. 2 and 6) an integral box-like projection 126 located in the right recess 58. The projection 126 has generally vertical, generally perpendicular side walls 130 and 134, and a generally horizonal bottom wall 138. The projection 126 decreases the height of the recess 58 in the area of the projection. The projection 126 prevents the downward flow of air that would otherwise result from converging air from the adjacent blade sets 66 in the recesses 54 and 58.

As with the baffles 118 and 122, the designed placement of projection 126 results from the blade sets 66 rotating in the counterclockwise direction as viewed in FIG. 2. If the blade sets 66 are designed to rotate in the clockwise direction, the projection 126 would be placed in the left recess 50, in a manner similar to that shown in FIG. 2, to prevent the downward flow of air that would otherwise result from converging air from the adjacent blade sets 66 in recesses 50 and 54.

The deck 30 also includes (FIGS. 1–3) two front deflectors 142 removably mounted on the front portion of the deck side wall 38. The deflectors 142 can be fixed to the deck 30 by any suitable means, such as bolts 146. Each front deflector 142 includes a generally horizontal portion 150 fixed to the horizontal portion 39 of the side wall 38 of the deck 30, and a lip 154 extending downwardly from the horizontal portion 150. The lip 154 allows venting of air but not discharge of grass clippings from the front of the deck 30. The deflectors 142 are preferably used only when cutting short grass.

Various features of the invention are set forth in the following claims.

I claim:

1. A rotary lawn mower comprising
a mulching deck including a generally horizontal top wall having a periphery, and a side wall depending from the periphery of the top wall to define a downwardly opening space, and
a set of cutting blades mounted for rotation about a generally vertical axis within the space, the set of blades including a lower, leading blade having a leading cutting edge and an upwardly angled trailing edge, an upper, trailing blade separate from the leading blade, the trailing blade having a leading cutting edge for cutting clippings deflected upwardly by the upwardly angled trailing edge of the leading blade, the trailing blade extending at a non-perpendicular angle relative to the leading blade such that clippings coming off the trailing edge of the leading bade are cut immediately by the trailing blade before the clippings start swirling around within the space, and a blade saddle for maintaining the leading blade in proper non-perpendicular position relative to the trailing blade such that the angle between the blades is in the range of less than sixty degrees to approximately eighteen degrees.

2. A lawn mower as set forth in claim 1 wherein the angle between the blades is less than thirty degrees.

3. A lawn mower as set forth in claim 1 wherein the angle between the blades is approximately eighteen degrees.

4. A front-vented mulching deck for a rotary lawn mower, the deck comprising a generally horizontal top wall having a periphery, a side wall depending from the periphery of the top wall to define a downwardly opening space, the side wall having a front portion and a horizontal portion, and a front deflector removably mounted only on the front portion of the deck side wall, the front deflector extending downwardly from the side wall so as to allow venting of air but not discharge of cut grass from the front of the deck, the front deflector including a horizontal portion and a lip portion extending downwardly from the horizontal portion of the front deflector, the horizontal portion of the front deflector being removably mounted to the horizontal portion of the side wall.

5. A mulching deck for a rotary lawn mower, the deck comprising a downwardly opening, generally circular, bowl-shaped first recess having a generally vertical central axis and a periphery, a downwardly opening, generally circular, bowl-shaped second recess having a generally vertical central axis and a periphery, and an integral, arcuate baffle extending downwardly adjacent and along the periphery of one of the recesses, the baffle being generally concentric with the one of the recesses, and the baffle impeding air flow from the second recess to the first recess.

6. A mulching deck as set forth in claim 5 wherein the baffle is outside the one of the recesses.

7. A mulching deck as set forth in claim 5 and further comprising a generally horizontal wall in which the first and second recesses are formed, and wherein the baffle extends downwardly from the bottom wall.

8. A mulching deck as set forth in claim 5 wherein the baffle extends approximately ninety degrees along the periphery of the one of the recesses from a point adjacent the other of the recesses.

9. A mulching deck for a rotary lawn mower comprising a downwardly opening, generally circular, bowl-shaped first recess having a generally vertical central axis and a periphery, a downwardly opening, generally circular, bowl-shaped second recess having a generally vertical central axis and a periphery, and an integral projection located in one of the first and second recesses, the projection having a generally horizontal bottom wall such that the one of the recesses has a decreased height in the area of the projection, the projection preventing downward flow of air that would otherwise result from converging air from two adjacent blades.

10. A mulching deck as set forth in claim 9 wherein the projection has a generally vertical side wall.

11. A mulching deck as set forth in claim 9 wherein the projection also has a generally vertical first side wall, and a generally vertical second side wall generally perpendicular to the first side wall.

12. A mulching deck for a rotary lawn mower, the deck comprising a generally horizontal top wall having a periphery, a side wall depending from the periphery of the top wall to define a downwardly opening space, the side wall having a front portion, and a plastic, dent-resistant, rust-proof insert in the space, the insert including a generally horizontal bottom wall spaced below the top wall of the deck, the bottom wall of the insert having therein a downwardly opening, generally circular, bowl-shaped center recess having a generally vertical central axis and a periphery, a downwardly opening, generally circular, bowl-shaped left recess having a generally vertical central axis and a periphery, the left recess being to the left of and rearward relative to the center recess, such that the inner front quarter of the left recess is adjacent the left rear quarter of the center recess, and a downwardly opening, generally circular, bowl-shaped right recess having a generally vertical central axis and a periphery, the right recess being to the right of and rearward relative to the center recess, such that the inner front quarter of the right recess is adjacent the right rear quarter of the center recess, the insert providing correct air flow for mulching and providing a sound barrier for reduced noise.

13. A mulching deck as set forth in claim 12 wherein the insert also includes a side wall extending upwardly from the bottom wall inside the side wall of the deck.

14. A rotary lawn mower comprising a front-vented mulching deck including a generally horizontal top wall having a periphery, a side wall depending from the periphery of the top wall to define a downwardly opening space, the side wall having a front portion, a plastic, dent-resistant, rust-proof insert in the space, the insert defining a downwardly opening, generally circular, bowl-shaped center recess having a generally vertical central axis, a downwardly opening, generally circular, bowl-shaped left recess having a generally vertical central axis, the left recess being to the left of and rearward relative to the center recess, such that the inner front quarter of the left recess is adjacent the left rear quarter of the center recess, and a downwardly opening, generally circular, bowl-shaped right recess having a generally vertical central axis, the right recess being to the right of and rearward relative to the center recess, such that the inner front quarter of the right recess is adjacent the right rear quarter of the center recess, each of the recesses having a periphery, the insert providing correct air flow for mulching, and providing a sound barrier for reduced noise, a center set of cutting blades mounted for rotation about the axis of the center recess, a left set of cutting blades mounted for rotation about the axis of the left recess, and a right set of cutting blades mounted for rotation about the axis of the right recess, each of the sets of cutting blades including a lower, leading blade having a leading cutting edge and an upwardly angled trailing edge, an upper trailing blade having a leading cutting edge for cutting clippings deflected upwardly by the upwardly angled trailing edge of the leading blade, the trailing blade extending at a non-perpendicular angle relative to the leading blade such that clippings coming off the trailing edge of the leading bade are cut immediately by the trailing blade before the clippings start swirling around within the associated recess, and a blade saddle for holding the leading and trailing blades in proper relationship to each other, each blade being driven and having a tip speed of approximately 18000 ft/min, wheels supporting the deck for movement over the ground, and a front deflector removably mounted on the front portion of the deck side wall, the front deflector extending downwardly from the side wall so as to allow venting of air but not discharge of clippings from the front of the deck, the insert including an integral, arcuate baffle extending downwardly adjacent the periphery of one of the recesses, the baffle impeding air flow from the one recess to an adjacent recess, and the insert also including, in one of the left and right recesses, an integral projection such that said one of the left and right recesses has a decreased height in the area of the projection, the projection preventing downward flow of air that would otherwise result from converging air from two adjacent blade sets.

15. A mulching deck as set forth in claim 14 wherein the baffle extends along the periphery of, and is outside of, and is generally concentric with the one of the recesses, wherein the mulching deck further comprises a generally horizontal wall in which the recesses are formed, wherein the baffle extends downwardly from the bottom wall, and wherein the baffle extends approximately ninety degrees along the periphery of the one of the recesses from a point adjacent the other of the recesses.

16. A mulching deck as set forth in claim 14 wherein the projection has a generally horizontal bottom wall, a generally vertical first side wall, and a generally vertical second side wall generally perpendicular to the first side wall.

17. A mulching deck as set forth in claim 14 wherein the insert includes a generally horizontal bottom wall spaced below the top wall of the deck, the bottom wall of the insert having therein the recesses, and wherein the insert also includes a side wall extending upwardly from the bottom wall inside the side wall of the deck.

* * * * *

UNITED STATES PATENT AND TRADEMARK OFFICE
CERTIFICATE OF CORRECTION

PATENT NO. : 5,890,354
DATED : April 6, 1999
INVENTOR(S) : Richard D. Bednar

It is certified that error appears in the above-identified patent and that said Letters Patent is hereby corrected as shown below:

The attached drawing Figure 1 should be substituted for Figure 1 in the Patent as issued.

Signed and Sealed this

Ninth Day of November, 1999

Attest:

Q. TODD DICKINSON

*Attesting Officer*     *Acting Commissioner of Patents and Trademarks*